UNITED STATES PATENT OFFICE.

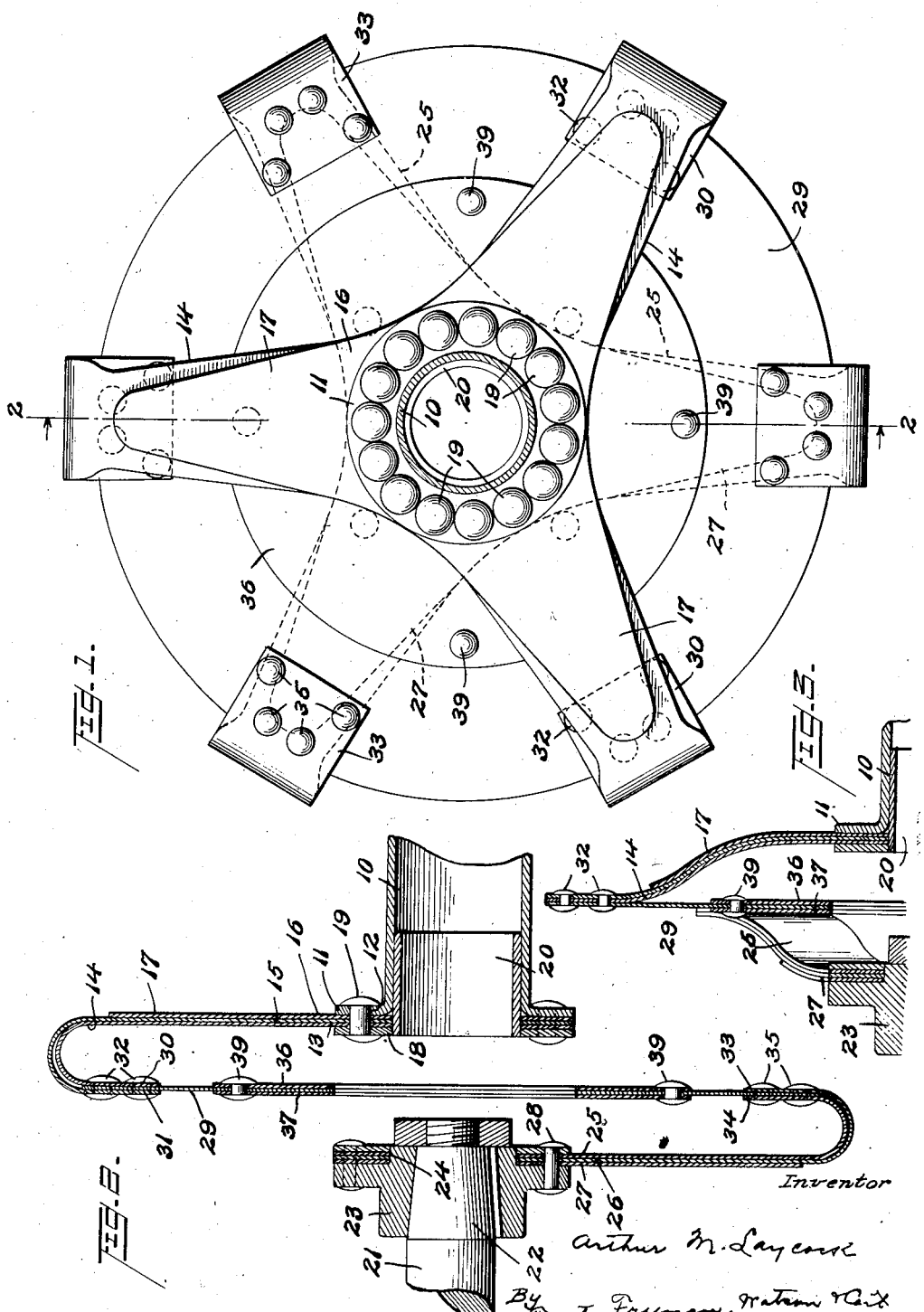

ARTHUR M. LAYCOCK, OF FORTYFORT, PENNSYLVANIA.

UNIVERSAL JOINT.

1,392,342.   Specification of Letters Patent.   Patented Oct. 4, 1921.

Application filed September 4, 1920. Serial No. 408,173.

*To all whom it may concern:*

Be it known that I, ARTHUR M. LAYCOCK, a citizen of the United States, and residing at Fortyfort, county of Luzerne, State of Pennsylvania, have invented certain new and useful Improvements in Universal Joints, of which the following is a specification.

This invention relates to universal joints and is particularly adapted for use in drive shafts, although it is not limited to that use. It embodies a construction in which there are no moving surfaces in contact to cause friction and wear, and to require lubrication. It furthermore not only permits the requisite movement out of line by the connected parts of the shaft as is necessary in universal joints, but also permits a certain amount of relative longitudinal movement between the connected parts of the shaft. It embodies a construction in which the bending strains and the power transmitting strains are thoroughly and properly distributed to all parts of the device whereby each part or portion takes care of its part of the strain, and there is no undue localization of strain at any time, or on any part causing deterioration. The invention is capable of embodiment in very simple and compact form at small expense and may be easily assembled and applied in use. It is furthermore adapted to be made and sold as an attachment which can be easily applied for instance, to connect the propeller or drive shaft with the transmission drive in motor vehicles as they now exist on the market and in use by owners with very slight change in the present construction of the drive mechanism. Other novel features will be apparent from the following description taken in connection with the drawings.

In the drawings—

Figure 1 is an end view of a device embodying the invention;

Fig. 2 is a section on the line 2—2 of Fig. 1, and

Fig. 3 is a similar section of a modified construction, partly broken away.

In the drawings I have shown the device applied to the end of the drive shaft 10 which may be that of an automobile and which is formed with an end flange 11 provided with rivet or bolt openings 12. Secured against the flange 11 and the end of the drive shaft there is a leaf spring construction which embodies a central section having an opening and fitting the flange 11 and radiating spring arms. The spring portion is made up of a number of lapping sections of flat spring metal, the central section 13 of the outer member fitting against the flange 11 and the arms 14 integral therewith radiating therefrom. A similar section 15 fits against the section 13 and has similar arms radiating and fitting close against the arms 14 so as to practically make a double disk and double arms. An additional disk 16 with shorter radiating arms 17 may also be placed against the section 15 so as to make the spring arms in the form of what are known as leaf springs and it will be understood that any number of these shorter arms may be used that is desired. In the form shown in Fig. 2 the inner section or arm 14 is bent at its outer end forwardly away from the end of the shaft 10 and then inwardly in U-shape and the lapping arm of the section 15 is similarly bent into U-shape over the section of arm 14, but as shown in the drawing a small space is left between the parts at the bottom of the U so as to allow some play and prevent binding during the spring action. It will be observed that in the particular form shown, there are three radiating arms but it will of course be understood that any number may be used within the choice of the builder without departing from my invention. The several disks above mentioned are secured to the flange 11 by a circular plate 18 through which passes the bolts or rivets 19 and they of course pass through the sections and the flange 11. A tubular member 20 may be placed within the end of the shaft 10 so as to properly center and hold the parts in position and it will be understood that these parts may be removable from the shaft 10 if desired.

The driven shaft 21 has a tapered end 22 on which is secured the sleeve 23 which has a cut-away portion on its face, leaving an inner shoulder 24 to receive the spring mechanism which is secured to this shaft. The spring mechanism is similar to that secured to the drive shaft and consists of the inner section 25 and the lapping section 26 with the corresponding lapping radiating arms and the reinforcing shorter armed section 27. The outer ends of the lapping portions of the arms are bent forwardly from the end of the shaft to which attached, as in the case of the drive shaft and are then given a U bend. The spring portion in this case is held in place on the sleeve 23 by removable bolts or rivets 28.

A plate 29 of spring metal is placed transversely between the ends of the two shafts and its outer margin enters between the ends 30 and 31 of the lapped sections of the spring arm and those sections are secured to the plate by any suitable means, such as the rivets 32. The arm sections constituting continuations of the parts 25 are similarly lapped at 33 and 34 on opposite sides of the outer margin of plate 29 and secured by rivets 35. It will be observed from the drawing that the arms of the spring on the drive shaft are staggered in their relation to the arms on the driven shaft and this is true of the connection to the ring or plate 29. The plate 29 has an enlarged opening in the center so as to make room for any longitudinal movement of the shafts with reference to each other and the inner margin may be strengthened by plates 36 and 37 secured to opposite sides of it, but not extending out to the margin and these plates may be fastened by means of rivets 39.

Instead of curving the spring arms forwardly and inwardly in U-shape as shown in Fig. 2, they may be curved forwardly and outwardly to a radial position fitting against the margin of plate 29 as shown in Fig. 3. In other respects the construction in Fig. 3 is made in the same way as that of Fig. 2.

This particular construction and arrangement gives considerable latitude for relative longitudinal and lateral movement between the drive shaft and the driven shaft, but at the same time it distributes the strains in such way that the side whipping will be reduced to a minimum. This construction furthermore properly distributes the driving strains as well as the twisting strains so as to prevent localization and consequent deterioration at any one point.

Having thus described my invention, what I claim as new and desire to secure by Letters Patent, is:

1. In a device of the class described the combination with a drive shaft of a driven shaft normally in line therewith and spaced a short distance therefrom, of spring arms radiating from and secured at one end to said drive shaft so curved or bent that their outer ends project forwardly beyond the end of the drive shaft, radiating spring arms secured to the end of the driven shaft in staggered relation to the arms on the drive shaft with their outer ends projecting beyond the end of the driven shaft toward the drive shaft and a floating plate to which the outer ends of both sets of arms are secured in staggered relation.

2. In a device of the class described the combination with a drive shaft of a driven shaft normally in line therewith and spaced a short distance therefrom, of flat metal spring arms radiating from and secured at one end to said drive shaft so curved or bent that their outer ends project forwardly beyond the end of the drive shaft, radiating flat metal spring arms secured to the end of the driven shaft in staggered relation to the arms on the drive shaft with their outer ends projecting beyond the end of the driven shaft toward the drive shaft and a floating plate to which the outer ends of both sets of arms are secured in staggered relation.

3. In a device of the class described the combination with a drive shaft of a driven shaft normally in line therewith and spaced a short distance therefrom, of metal leaf spring arms radiating from and secured at one end to said drive shaft so curved or bent that their outer ends project forwardly beyond the end of the drive shaft, radiating metal leaf spring arms secured to the end of the driven shaft in staggered relation to the arms on the drive shaft with their outer ends projecting beyond the end of the driven shaft toward the drive shaft and a floating plate to which the outer ends of both sets of arms are secured in staggered relation, the said floating plate having a hole therein at the center opposite the ends of said shafts.

4. In a device of the class described the combination with a drive shaft of a driven shaft normally in line therewith and spaced a short distance therefrom, of metal leaf spring arms radiating from and detachably secured at their inner ends to the end of said drive shaft so curved or bent that their outer ends project forwardly beyond the end of the drive shaft, radiating metal leaf spring arms detachably secured to the end of the driven shaft in staggered relation to the arms on the drive shaft with their outer ends projecting beyond the end of the driven shaft toward the drive shaft, a floating flexible metal plate having an enlarged central hole positioned transversely between the ends of said shafts and means securing the outer ends of said arms to said plate around its margin in staggered relation.

5. In a device of the class described the combination with a drive shaft of a driven shaft normally in line therewith and spaced a short distance therefrom, of metal leaf spring arms radiating from and detachably secured at their inner ends to the end of said drive shaft so curved or bent that their outer ends project forwardly beyond the end of the drive shaft, radiating metal leaf spring arms detachably secured to the end of the driven shaft in staggered relation to the arms on the drive shaft with their outer ends projecting beyond the end of the driven shaft toward the drive shaft, a floating flexible metal plate having an enlarged central hole positioned transversely between the ends of said shafts and having secured to its sides from its inner margin part way toward its outer margin similar strengthening plates and means for securing the ends of said arms to said plate around its outer margin outside of said strengthening plate.

6. In a device of the class described the combination with a drive shaft of a driven shaft normally in line therewith and spaced a short distance therefrom, of metal leaf spring arms radiating from and detachably secured at their inner ends to the end of said drive shaft and curved forwardly and inwardly in U form at their outer ends, a ring like flexible metal plate having a central opening mounted transversely between the ends of said shaft, means for securing the inwardly turned ends of said arms to said plate around the margin, similarly formed arms detachably secured to the driven shaft at their inner ends and similarly curved and secured to said plate at their outer ends in staggered relation to the arms on the drive shaft.

7. In a device of the class described the combination with a drive shaft of a driven shaft normally in line therewith and spaced a short distance therefrom, of metal leaf spring arms radiating from and detachably secured at their inner ends to the end of said drive shaft and curved forwardly and inwardly in U form at their outer ends, a ring like flexible metal plate having a central opening mounted transversely between the ends of said shaft, means for securing the inwardly turned ends of said arms to said plate around the margin, similarly formed arms detachably secured to the driven shaft at their inner ends and similarly curved and secured to said plate at their outer ends in staggered relation to the arms on the drive shaft, the said plate having reinforcing plates secured to its sides around its inner portion.

8. An attachment adapted for use as a universal joint connection between alined driving and driven shafts comprising a pair of similar spring metal disks having central openings adapted to be secured respectively to the ends of the two shafts and each having similar flat radiating spring arms bent at their outer ends forwardly away from the shaft end to which attached, a spring metal plate having a central opening arranged transversely between said disks and means securing the outer ends of said arms to the outer margin of said plate in staggered relation.

9. An attachment adapted for use as a universal joint connection between alined driving and driven shafts comprising a pair of similar spring metal disks with similar radiating arms super-posed and fitting each other and having corresponding central openings adapting them to be secured to the end of one shaft the outer ends of the arms being bent forwardly away from the shaft end and inwardly in U form, a spring metal plate having a central opening transversely in advance of said disks the inwardly bent ends of the super-posed sections of the arm being brought to position bearing against said plate on opposite sides, means for securing said ends to said plate, a similar pair of disks and radiating arms similarly curved and secured to said plate at points in staggered relation to said first mentioned arms and adapted to be secured at its center to the other shaft.

10. An attachment adapted for use as a universal joint connection between alined driving and driven shafts comprising a pair of similar spring metal disks with similar radiating arms super-posed and fitting each other and having corresponding central openings adapting them to be secured to the end of one shaft the outer ends of the arms being bent forwardly away from the shaft end and inwardly in U form, a spring metal plate having a central opening transversely in advance of said disks the inwardly bent ends of the super-posed section of the arm being brought to position bearing against said plate on opposite sides, means for securing said ends to said plate, a similar pair of disks and radiating arms similarly curved and secured to said plate at points in staggered relation to said first mentioned arms and adapted to be secured at its center to the other shaft, the outer layer of each arm at the U bend being spaced slightly from the inner layer to permit the spring action without binding.

In testimony whereof I affix my signature.

ARTHUR M. LAYCOCK.